Nov. 6, 1934.  W. A. WHITING  1,979,655
METHOD OF LINING CONCRETE PIPE AND THE LIKE
Filed June 23, 1933
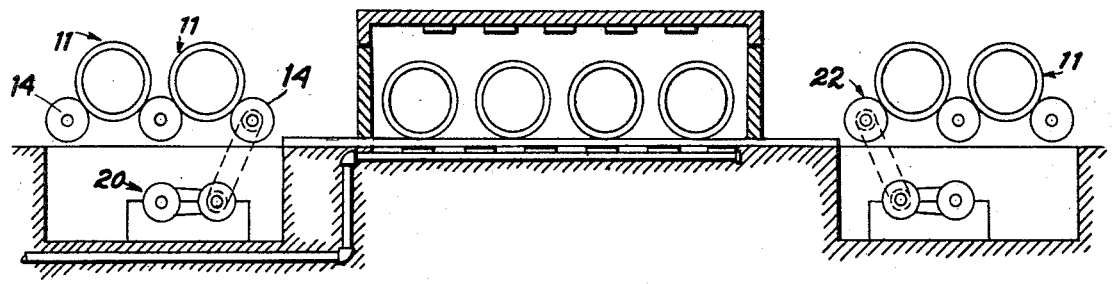
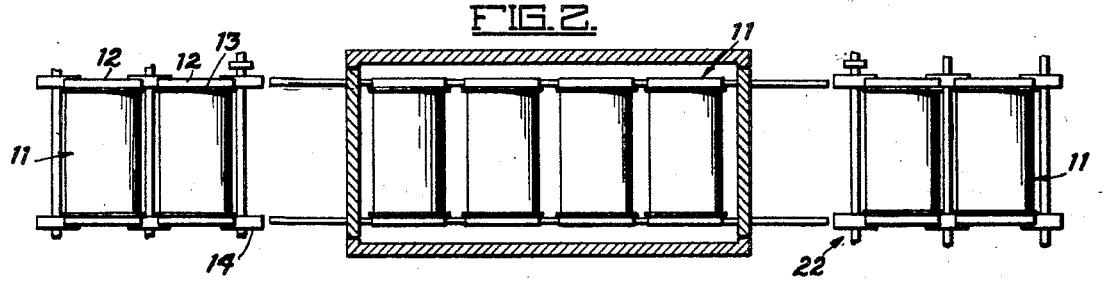
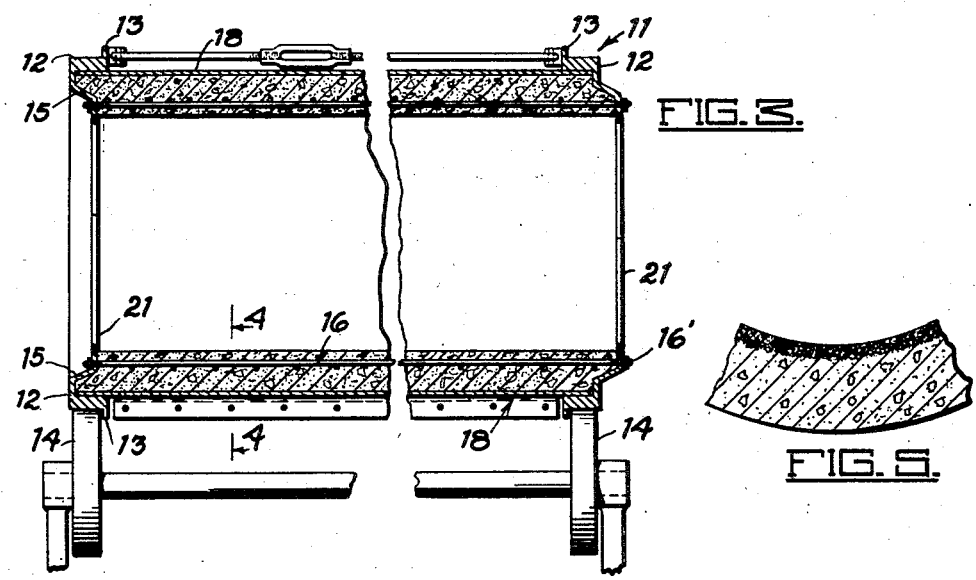
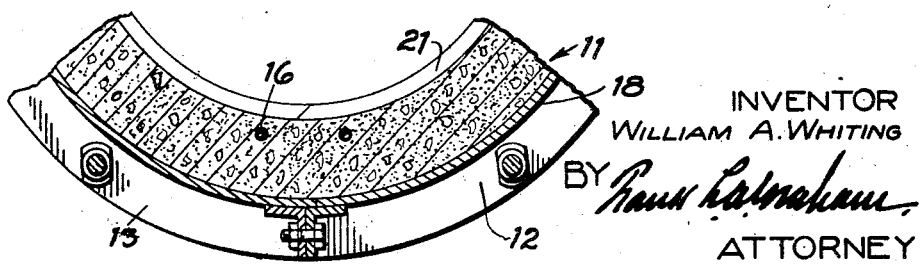
INVENTOR
WILLIAM A. WHITING
BY
ATTORNEY Patented Nov. 6, 1934

1,979,655

UNITED STATES PATENT OFFICE 1,979,655

METHOD OF LINING CONCRETE PIPE AND THE LIKE

William A. Whiting, Huntington Park, Calif., assignor to American Concrete and Steel Pipe Company, a corporation of Delaware Application June 23, 1933, Serial No. 677,264

4 Claims. (Cl. 25—154)

My invention relates to the art of producing concrete pipe and the like for conveying liquids, particularly of the type which contains acids or other substances, usually found in sewage, which attack the walls of the pipe as ordinarily made.

Attempts have been made to apply a protecting coating or lining of acid-resisting material to concrete pipes by spraying such material or brushing the material on the inner surface of the wholly cured pipe, but such practices have been unsatisfactory due to the fact that such coating forms a skin which during the process of drying fails to adhere to the material of the pipe, resulting in blisters or cracks which permit undesirable substances to gain access under the coating and attack the pipe. In such instances the lining or coating becomes loosened and the value of the coating as a protective lining is destroyed.

The present market affords several compounds which make an appropriate protective coating or lining for pipes of the class referred to, but I am unaware of any method of applying such materials to a concrete pipe which has proven successful other than by my method herein described.

It is the object of my invention to provide a simple and economical method of lining a concrete pipe and the like with an acid-resisting material which will completely adhere to the pipe in such a manner that a bond is formed between the pipe and the lining, producing a practically integral structure.

This object I accomplish by heating a green pipe section to partially cure the pipe, and, while the pipe remains at a temperature above normal, applying to the interior surface of the pipe a heated lining material, the temperature of the pipe and lining being such that the contraction of the material of the pipe and lining during cooling will be approximately the same whereby a bonding effect will be produced between such materials.

By this method, just described in its broadest aspect, I have produced a protective lining on concrete pipes which has none of the objectionable features of such articles referred to above.

As an aid in illustrating my method, I refer to drawing forming a part of my application which is for illustrative purposes only, and in which—

Fig. 1 is a diagrammatic vertical sectional view of a plant designed to facilitate handling the pipe during the practice of my method;

Fig. 2 is a diagrammatic plan view of the pipe shown in Fig. 1;

Fig. 3 is a longitudinal sectional view of a mold or form showing the pipe therein preparatory to application of the lining;

Fig. 4 is an enlarged sectional view on line 4—4 in Fig. 3; and

Fig. 5 is a sectional view of a portion of the finished pipe with the lining therein.

My process is more particularly described as follows:

Forms generally indicated at 11 are used for forming a section of pipe, these forms consisting of end rings 12, each having an outwardly extending flange 13 for the purpose of retaining the forms on supporting pulleys or wheels 14. Each ring 12 is provided with an inwardly extending flange 15 shaped to form bell and spigot ends on the concrete pipe section formed therein. Reference numeral 16 designates rods which extend through the flanges 15 being secured by means of nuts 16', the rods becoming, in the finished pipe, a part of the reinforcing structure therein. Retained in the rings 12, is a cylinder 18 which forms a base upon which the concrete pipe is formed.

The forms 11 being placed on the pulleys 14, such pulleys are rotated by any suitable mechanism from a motor 20. Concrete is placed into the form during its rotation and spread on the interior of the form by centrifugal force due to the speed of rotation of the form. The compacting of the body of concrete causes the water to be collected on the interior face of the pipe, and, after the form has been rotated sufficiently to compact the concrete to the desired density, the pipe is drained of free water. The forms containing the green pipe are then placed in an oven or kiln wherein the pipe is heated to a temperature of from 150° to 200° F. for a period of from eight to twelve hours, after which the forms with the pipes are removed while partially green and placed on a rotating device generally indicated at 22 like that heretofore described. The water ring 21, or a similar ring, is then placed in each form to retain the lining material within the pipe and shape the end of such material during the lining operation.

The lining compound, preferably a sulphur compound such as may be purchased on the market, is heated to a temperature of approximately 250° F., variable according to the composition of the lining material used, and either sprayed or poured into the rotating form onto the inner surface of the concrete pipe upon which it is evenly spread due to the centrifugal force caused by the rotating body.

After the lining material has been compacted on the interior of the pipe, the forms are removed to a yard where the curing process is finished, the pipe being occasionally water sprayed to prevent drying of the pipe before properly cured.

It is to be particularly noted that the relative temperature of the concrete body and the temperature of the lining compound as given above, may vary according to the nature of the lining material used, but such temperatures should be such that, taking into consideration the rate of contraction of the materials during the curing operation, the temperatures should be regulated so that the rate of contraction of the two materials should be approximately the same so that the desired result of maintaining a bond between the concrete and the lining is attained.

The thickness of the lining applied may vary according to the character of work required of the pipe, but I have found most satisfactory results from a lining varying from one-eighth to three-eighths inch in thickness.

I claim as my invention:

1. The method of forming a lining on the inner wall of concrete pipe and the like which consists in, forming a concrete pipe by centrifugal distribution of concrete in a rotating form, partially drying the pipe in a kiln with heat above normal temperature, then distributing a hot lining material of a temperature above the temperature of the pipe on the inner wall of the pipe by centrifugal action and finally curing the lined pipe under atmospheric conditions.

2. The method of forming a lining on the inner wall of concrete pipe and the like which consists in, heating a green concrete pipe section above normal atmospheric temperature and then distributing a layer of lining compound on the interior of the pipe section by centrifugal action resultant from rotation of the pipe section, said lining compound being heated to a temperature above that of the pipe.

3. The method of forming a lining on the inner wall of concrete pipe and the like which consists in, forming a concrete pipe by centrifugal distribution of concrete in a rotating form, partially drying the pipe in a kiln at a temperature of approximately 150° F., then distributing on the inner face of the hot pipe section a lining compound having a temperature of approximately 250° F.

4. The method of forming a lining on the inner wall of concrete pipe and the like which consists in, heating a green concrete pipe section and applying to the inner surface of the heated pipe section a layer of hot lining material above the temperature of the pipe.

WILLIAM A. WHITING.